(12) United States Patent
Asanuma

(10) Patent No.: US 12,286,251 B2
(45) Date of Patent: Apr. 29, 2025

(54) FLYING BODY, CONTROLLER, CONTROL PROGRAM, AND CONTROL METHOD

(71) Applicant: KABUSHIKI KAISHA TOSHIBA, Tokyo (JP)

(72) Inventor: Yutaka Asanuma, Bunkyo Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 284 days.

(21) Appl. No.: 18/161,760

(22) Filed: Jan. 30, 2023

(65) Prior Publication Data
US 2024/0034490 A1 Feb. 1, 2024

(30) Foreign Application Priority Data
Jul. 27, 2022 (JP) ................ 2022-119267

(51) Int. Cl.
| | |
|---|---|
| *B64U 20/20* | (2023.01) |
| *B64C 27/32* | (2006.01) |
| *B64U 10/16* | (2023.01) |
| *B64U 20/83* | (2023.01) |
| *B64U 50/20* | (2023.01) |

(52) U.S. Cl.
CPC ............ *B64U 20/20* (2023.01); *B64C 27/325* (2013.01); *B64U 10/16* (2023.01); *B64U 20/83* (2023.01); *B64U 50/20* (2023.01); *B64C 2220/00* (2013.01); *B64U 2201/10* (2023.01)

(58) Field of Classification Search
CPC ...... B64U 20/20; B64U 10/16; B64C 2220/00
See application file for complete search history.

(56) References Cited

U.S. PATENT DOCUMENTS

| | | | |
|---|---|---|---|
| 10,118,692 B1* | 11/2018 | Beckman | B64C 27/473 |
| 11,754,708 B1* | 9/2023 | Durand | G01S 15/87 |
| | | | 367/101 |
| 2023/0377548 A1* | 11/2023 | Greenberg | B64U 20/20 |

FOREIGN PATENT DOCUMENTS

| | | |
|---|---|---|
| JP | 2019525864 A | 9/2019 |
| JP | 6637622 B2 | 12/2019 |
| WO | 2018005472 A1 | 1/2018 |

* cited by examiner

*Primary Examiner* — Justin M Benedik
(74) *Attorney, Agent, or Firm* — Holtz, Holtz & Volek PC

(57) ABSTRACT

According to one embodiment, a flying body includes a radar, a supporter, a plurality of rotors supported by the supporter, and a controller. The rotors include a first rotor. The radar is configured to perform a detection operation and a non-detection operation. The controller is configured to perform a first control operation in a first transition from the non-detection operation to the detection operation. The controller is configured to perform a first change in the first control operation to change a rotational speed of the first rotor from a rotational speed of the first rotor in the non-detection operation. The detection operation is performed after the first control operation.

19 Claims, 7 Drawing Sheets

FLYING BODY, CONTROLLER, CONTROL PROGRAM, AND CONTROL METHOD

CROSS-REFERENCE TO RELATED APPLICATIONS

This application is based upon and claims the benefit of priority from Japanese Patent Application No. 2022-119267, filed on Jul. 27, 2022; the entire contents of which are incorporated herein by reference.

FIELD

Embodiments described herein generally relate to a flying body, a controller, a control program and a control method.

BACKGROUND

For example, in a flying body such as a drone, detection is performed by radar or the like. High precision detection is desired in flying bodies.

DETAILED DESCRIPTION

Figure 1:
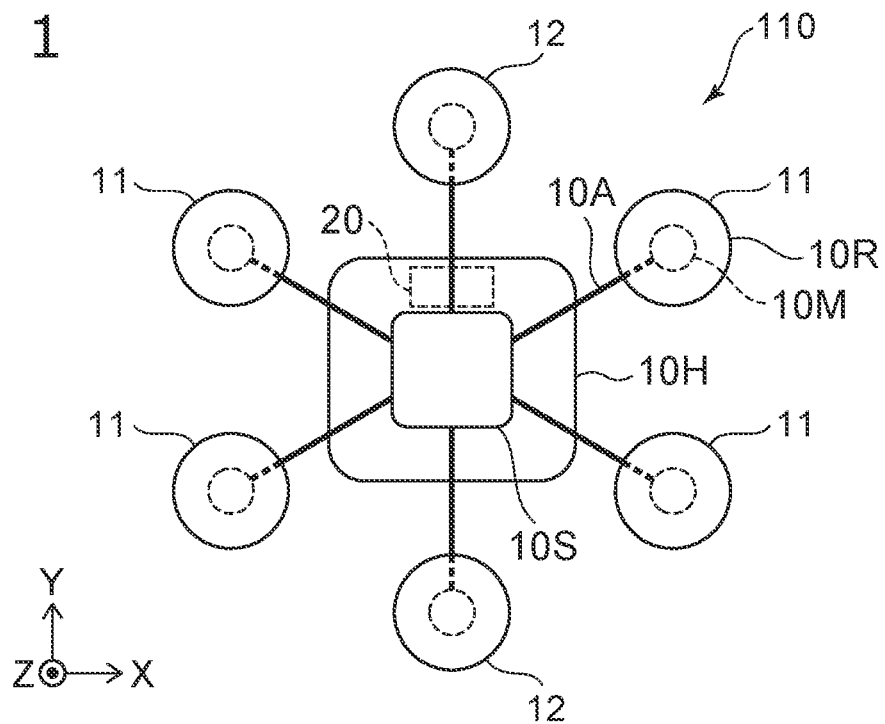
FIG. 1 is a schematic plan view illustrating a flying body according to a first embodiment.

According to one embodiment, a flying body includes a radar, a supporter, a plurality of rotors supported by the supporter, and a controller. The rotors include a first rotor. The radar is configured to perform a detection operation and a non-detection operation. The controller is configured to perform a first control operation in a first transition from the non-detection operation to the detection operation. The controller is configured to perform a first change in the first control operation to change a rotational speed of the first rotor from a rotational speed of the first rotor in the non-detection operation. The detection operation is performed after the first control operation.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

FIG. 1 is a schematic plan view illustrating a flying body according to the first embodiment.

Figure 2:
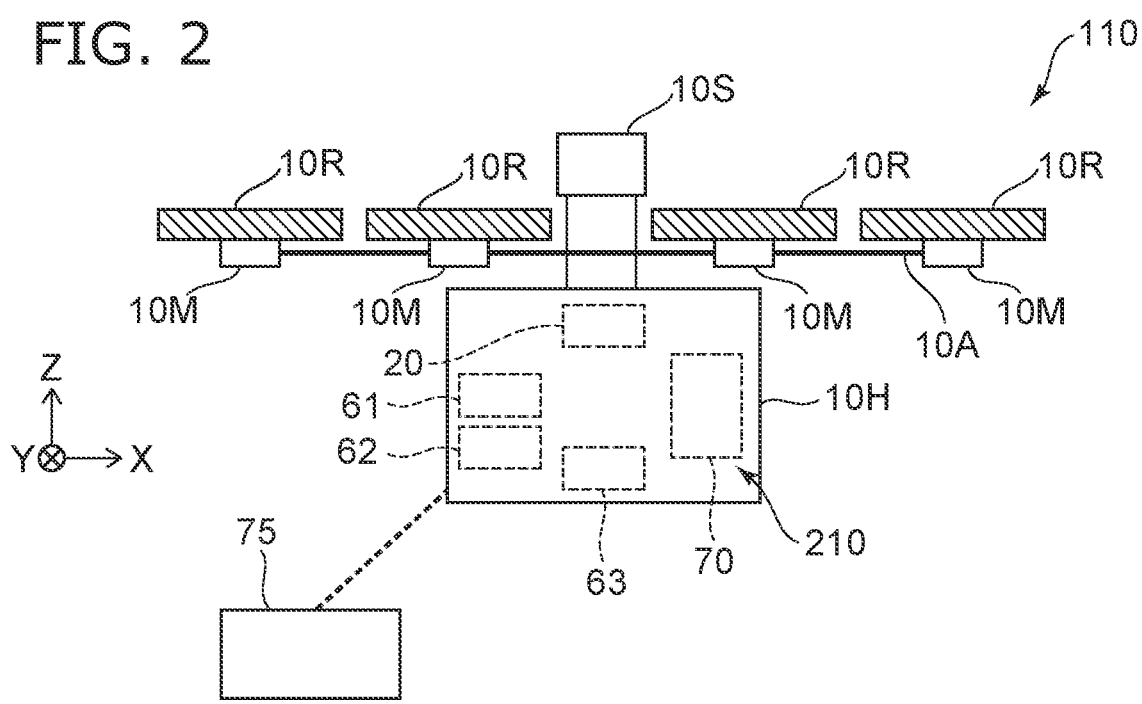
FIG. 2 is a schematic side view illustrating the flying body according to the first embodiment.

FIG. 2 is a schematic side view illustrating the flying body according to the first embodiment.

As shown in FIGS. 1 and 2, a flying body 110 according to the embodiment includes a radar 20, a supporter 10S, a plurality of rotors 10R, and a controller 70. The plurality of rotors 10R are supported by the supporter 10S.

In this example, a plurality of arms 10A are provided. A part (for example, an end) of one of the plurality of arms 10A is connected to the supporter 10S. Another part (for example, another end) of one of the plurality of arms 10A is connected to one of the plurality of rotors 10R. One of the plurality of rotors 10R is supported by one of the plurality of arms 10A.

The plurality of rotors 10R are, for example, rotary blades. For example, a plurality of motors 10M are provided. The plurality of rotors 10R are rotated by the plurality of motors 10M. The flying body 110 flies by the rotation of the plurality of rotors 10R. Flying body 110 is, for example, an unmanned aerial vehicle. Flying body 110 is, for example, a drone.

In this example, the number of the plurality of rotors 10R is 6. The number of the plurality of rotors 10R may be any number of 3 or more. The number of the plurality of rotors 10R may be, for example, 4 or more.

The plurality of rotors 10R are provided, for example, on an X-Y plane. A direction perpendicular to the X-Y plane is defined as the Z-axis direction.

In this example, a structure body 10H is fixed to the supporter 10S. The structure body 10H may be, for example, a housing. A direction from the structure body 10H to the supporter 10S is, for example, along the Z-axis direction.

The radar 20 is fixed to structure body 10H, for example. The radar 20 may be fixed to the supporter 10S. The radar 20 is configured to, for example, emit an electromagnetic wave and to detect the electromagnetic wave reflected by a detection target. The electromagnetic wave may be millimeter waves, for example. The radar 20 may detect vibrations of the detection target. For example, the radar 20 may detect the presence or absence of the vibration of the detection target at a target frequency. The detection target may include, for example, power lines, electric cables or electric wires.

As shown in FIG. 2, a radar controller 61 may be provided in the structure body 10H. The operation of the radar 20 is controlled by the radar controller 61. The operation of the radar 20 includes a detection operation and a non-detection operation. The non-detection operation may be in the non-detection state. These operations will be described later. As shown in FIG. 2, in the structure body 10H, a communication circuit 62, a battery 63, and the like may be provided.

As shown in FIG. 2, in this example, the controller 70 is provided in the structure body 10H. At least a part of the functions of the controller 70 may be performed by a device provided separately from the flying body 110. For example, an operation device 75 for remotely operating the flying body 110 is provided. At least a part of the operation device 75 may be configured to perform at least a part of the operation of the controller 70. For example, a control signal from the operation device 75 may be supplied to the communication circuit 62, and the plurality of rotors 10R may be controlled through the communication circuit 62. For example, a control signal from the operation device 75 may be supplied to the communication circuit 62, and the operation of the radar 20 may be controlled through the communication circuit 62.

An example of control of the flying body 110 will be described below. In the following examples, control is performed by the controller 70. A description will be given assuming that a control in which a part of the control is performed by the operation device 75 is also performed by the controller 70.

In embodiments, the detection operation and the non-detection operation are performed in radar 20. In the detection operation, the radar 20 detects the detection target. In the non-detection operation, the detection operation is not performed.

In the embodiment, the rotational speed of at least one of the plurality of rotors 10R is changed between the detection operation and the non-detection operation. As a result, it is possible to suppress deterioration in detection accuracy in the detection operation caused by vibrations based on the rotation of the plurality of rotors 10R. According to the embodiments, it is possible to provide a flying body capable of highly accurate detection.

For example, as shown in FIG. 1, the plurality of rotors 10R includes a first rotor 11. The first rotor 11 is the rotor 10R whose rotational speed is changed among the plurality of rotors 10R. The change in the rotational speed in the first rotor 11 is one of an increase and a decrease in the rotational speed.

As shown in FIG. 1, the plurality of rotors 10R may include a second rotor 12. The second rotor 12 is the rotor 10R whose rotational speed is changed among the plurality of rotors 10R. In the second rotor 12, the rotational speed is changed by the other of the increase and the decrease in the rotational speed.

For example, the rotational speed of the first rotor 11 in the detection operation is higher than the rotational speed of the first rotor 11 in the non-detection operation. For example, the rotational speed of the second rotor 12 in the detection operation is lower than the rotational speed of the second rotor 12 in the non-detection operation. Such control is performed by the controller 70.

Figure 3A:
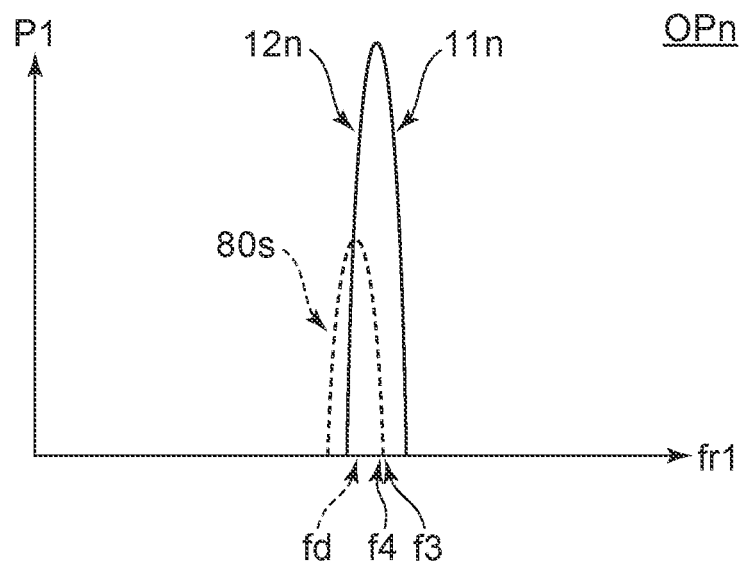
FIG. 3A and FIG. 3B are schematic diagrams illustrating the operation of the flying body according to the first embodiment.
Figure 3B:
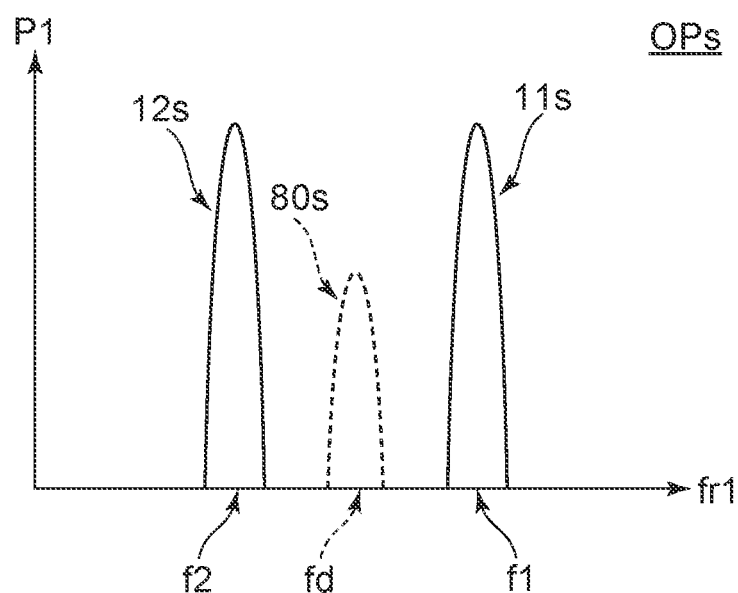

FIG. 3A and FIG. 3B are schematic diagrams illustrating the operation of the flying body according to the first embodiment.

FIG. 3A corresponds to the non-detection operation OPn. FIG. 3B corresponds to the detection operation OPs. The horizontal axis of these figures is the frequency fr1. The vertical axis of these figures is the intensity (power P1) of the vibration spectrum. In the non-detection operation OPn, the rotational speeds of the first rotor 11 and the second rotor 12 are the same. In this example, the rotational speed of the first rotor 11 in the detection operation OPs is changed to be higher than the rotational speed of the first rotor 11 in the non-detection operation OPn. The rotational speed of the second rotor 12 in the detection operation OPs is changed to be lower than the rotational speed of the second rotor 12 in the non-detection operation OPn.

As shown in FIG. 3A, in the non-detection operation OPn, the vibration spectrum $11n$ caused by the rotation of the first rotor 11 overlaps the vibration spectrum $12n$ caused by the rotation of the second rotor 12. These spectra may overlap the spectrum $80s$ of the vibrations of the detection target. If the detection target is detected by the radar 20 in this state, it is difficult to accurately detect the vibration state of the detection target due to the adverse effects of the vibration caused by the rotation of the rotor 10R.

As shown in FIG. 3B, the spectrum $11s$ of the vibration caused by the rotation of the first rotor 11 in the detection operation OPs is changed to be higher than the vibration spectrum $11n$ of the vibration caused by the rotation of the first rotor 11 in the non-detection operation OPn. The spectrum $12s$ of vibration caused by the rotation of the second rotor 12 in the detection operation OPs is changed to be lower than the vibration spectrum $12n$ of vibration caused by the rotation of the second rotor 12 in the non-detection operation OPn. The spectrum $11s$ and the spectrum $12s$ are separated from the spectrum $80s$ of the vibration of the detection target. The spectrum $11s$ and the spectrum $12s$ do not substantially overlap spectrum $80s$ of the vibration of the detection target.

In the embodiment, in the detection operation OPs, it is possible to suppress the adverse effects of vibration caused by the rotation of the plurality of rotors 10R.

For example, the controller 70 is configured to perform a first control operation in a first transition from the non-detection operation OPn to the detection operation OPs. In the first control operation, the controller 70 performs a first change of changing the rotational speed of the first rotor 11 from the rotational speed of the first rotor 11 in the non-detection operation OPn. The detection operation is performed after the first control operation described above.

For example, in the above-described first control operation, the controller 70 performs a second change to change the rotational speed of the second rotor 12 from the rotational speed of the second rotor 12 in the non-detection operation OPn. For example, the first change includes performing one of the increase and the decrease (for example, increase) in the rotational speed of the first rotor 11 from the rotational speed of the first rotor 11 in the non-detection operation OPn. The second change includes performing the other one of the increase and the decrease (for example, decrease) in the rotational speed of the second rotor 12 from the rotational speed of the second rotor 12 in the non-detection operation OPn.

Figure 4:
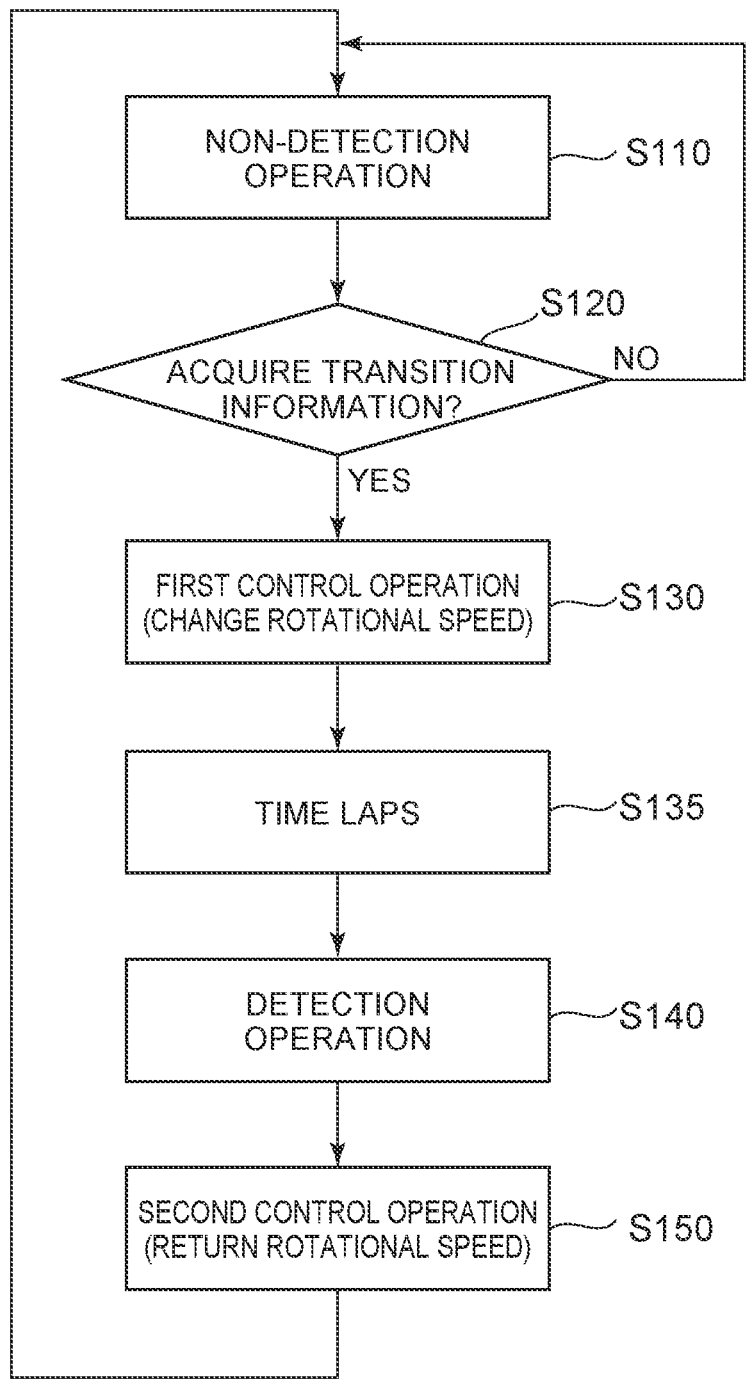
FIG. 4 is a flowchart illustrating an operation in the flying body according to the first embodiment.

FIG. 4 is a flowchart illustrating an operation in the flying body according to the first embodiment.

As shown in FIG. 4, the non-detection operation (step S110) is performed. In the non-detected operation, for example, the flying body 110 is in flight.

As shown in FIG. 4, it is determined whether transition information to be shifted from the non-detection operation to the detection operation has been acquired (step S 120). The transition information is based on, for example, at least one of acquisition of input information from a user, a predetermined time, a position of the flying body 110, a relative position with respect to the detection target and the flying body 110, or a detection result by a sensor provided in the flying body 110. If the transition information has not been acquired, the process returns to step S110. Then, the non-detection operation continues. The sensors provided in the flying body 110 may include, for example, an optical sensor (e.g., an imaging device such as a camera) and an electromagnetic wave sensor (For example, a laser). The detection result by the sensor may include a determination result based on a defined criterion.

If the transition information is obtained in step S 120, the process proceeds to step S130. In step S130, the first control operation is performed. In the first control operation, the rotational speed of at least one of the plurality of rotors 10R is changed. For example, the first change and the second change are performed. As described above, in the first change, one of the increase and the decrease (for example, the increase) in the rotational speed of the first rotor 11 from the rotational speed of the first rotor 11 in the non-detection operation OPn is performed. In the second modification, the other one of the increase and the decrease (for example, the decrease) in the rotational speed of the second rotor 12 from the rotational speed of the second rotor 12 in the non-detection operation OPn is performed.

As shown in FIG. 4, a time lapse may be provided, if necessary, after step S130 (step S135). The rotational speed of the plurality of rotors 10R is changed by the passage of time, and then stabilized.

As shown in FIG. 4, after the first control operation (step S130), the radar 20 performs the detection operation OPs (step S140).

As shown in FIG. 4, the controller 70 may perform a second control operation (step S150) after the detection operation OPs. In the second control operation, the rotational speed of the plurality of rotors 10R is returned to the rotational speed in the non-detection operation. After the step 150, the process returns to the step 110.

Thus, the controller 70 may perform the second control operation at a time of a second transition from the detection operation OPs to the non-detection operation OPn. The second control operation includes, for example, returning the rotational speed of the first rotor 11 to the rotational speed of the first rotor 11 in the non-detection operation OPn. The second control operation includes returning the rotational speed of the second rotor 12 to the rotational speed of the second rotor 12 in the non-detection operation OPn.

As described above, in the embodiment, the first control operation is performed on the basis of the transition information based on at least one of the acquisition of the input information from the user, the predetermined time, the position of the flying body 110, or the position relative to the detection target and the flying body 110. Thereby, the detection operation OPs can be performed in a state where the rotation speed of at least one of the plurality of rotors 10R is changed. High precision detection is possible.

As described above, upon obtaining the transition information, the controller 70 performs the first control operation (change of the rotational speed). After the first control operation, the radar 20 performs the detection operation OPs. After the detection operation OPs, the controller 70 performs the second control operation (returning the rotational speed).

These series of operations (step 110 to step 150) may be repeated.

As shown in FIGS. 3A and 3B, the frequency (third frequency f3) corresponding to the rotational speed of the first rotor 11 in the non-detection operation OPn is changed to the frequency (first frequency f1) corresponding to the rotational speed of the first rotor 11 in the detection operation OPs. The frequency (fourth frequency f4) corresponding to the rotational speed of the second rotor 12 in the non-detection operation OPn is changed to the frequency (second frequency f2) corresponding to the rotational speed of the second rotor 12 in the detection operation OPs.

For example, the first frequency f1 is higher than the second frequency f2. An absolute value of a difference between the first frequency f1 and the second frequency f2 is larger than an absolute value of a difference between the third frequency f3 and the fourth frequency f4. For example, the third frequency f3 may be substantially the same as the fourth frequency f4.

As shown in FIG. 3B, the state of the vibration (spectrum 80s) at a detection frequency fd is detected regarding the detection target. The state of the vibration includes presence or absence of the vibration and the intensity of the vibration (For example, power). As shown in FIG. 3B, the detection frequency fd is between the first frequency f1 and the second frequency f2.

In one example, the third frequency f3 and the fourth frequency f4 overlap the detection frequency fd. The first frequency f1 and the second frequency f2 do not overlap the detection frequency fd. For example, an absolute value of a difference between the first frequency f1 and the detection frequency fd is larger than an absolute value of a difference between the third frequency f3 and the detection frequency fd. For example, an absolute value of a difference between the second frequency f2 and the detection frequency fd is larger than an absolute value of a difference between the fourth frequency f4 and the detection frequency fd.

In the detection operation OPs, such the change in the rotational speed is performed. For example, the difference between the first frequency f1 and the detection frequency fd and the difference between the second frequency f2 and the detection frequency fd is not less than a resolution of the frequency measurement at the time of the detection of vibration. The resolution of the frequency measurement corresponds, for example, to the reciprocal of the measurement time. For example, when the measurement time is 0.1 seconds, the resolution of the measurement frequency is about 10 Hz. In this case, the absolute value of the difference between the first frequency f1 and the detection frequency fd, and the absolute value of the difference between the second frequency f2 and the detection frequency fd are 10 Hz or more.

In at least one of the plurality of rotors 10R, the rotational speed after the change is not more than the maximum rotational speed and not less than the minimum rotational speed set for the plurality of rotors 10R.

In the embodiment, the frequency component (spectrum 80s) of the vibration of the detection target may include natural number times of at least one of the frequency (frequency of spectrum 11n) of the rotational speed of the first rotor 11 in the non-detection operation OPn, or the frequency (frequency of spectrum 12n) of the rotational speed of the second rotor 12 in the non-detection operation OPn.

Some examples of changing the rotational speed will be described below.

Figure 5A:
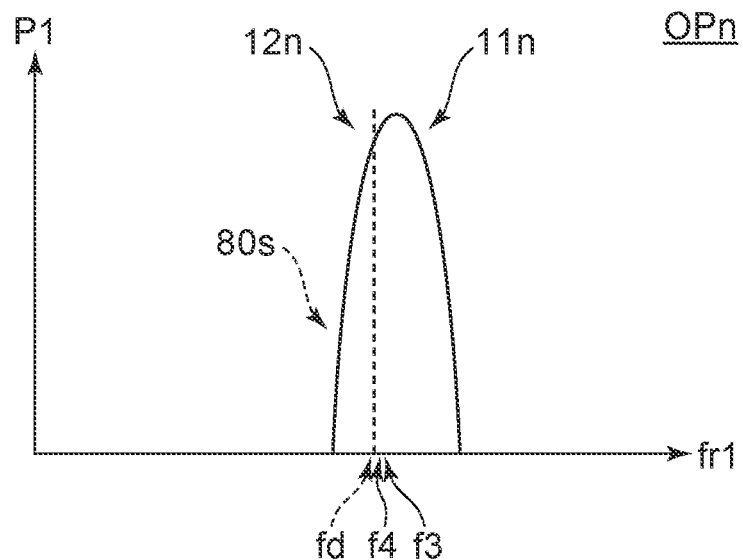
FIG. 5A and FIG. 5B are schematic diagrams illustrating an operation in the flying body according to the first embodiment.
Figure 5B:
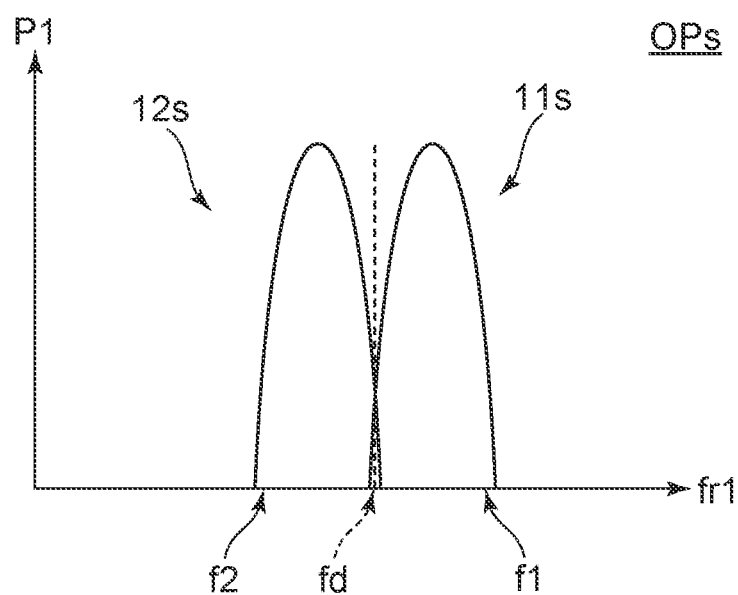

FIG. 5A and FIG. 5B are schematic diagrams illustrating an operation in the flying body according to the first embodiment.

As shown in FIG. 5A, in the non-detection operation OPn, the vibration of the flying body 110 includes a component of the third frequency f3 (spectrum 11n) corresponding to the rotational speed of the first rotor 11 and a component of the fourth frequency f4 (spectrum 12n) corresponding to the rotational speed of the second rotor 12.

As shown in FIG. 5B, in the detection operation OPs, the vibration of the flying body 110 includes a component (spectrum 11s) of the first frequency f1 corresponding to the rotational speed of the first rotor 11 and a component (spectrum 12s) of the second frequency f2 corresponding to the rotational speed of the second rotor 12.

The power P1 (first power) of the component (spectrum 11s) of the first frequency f1 at the detection frequency fd is smaller than the power P1 (third power) of the component (spectrum 11n) of the third frequency f3 at the detection frequency fd. For example, the first power is ¹⁄₁₀ or less of the third power. The first power may be substantially zero.

The power P1 (second power) of the component (spectrum 12s) of the second frequency f2 at the detection frequency fd is smaller than the power P1 (fourth power) of the component (spectrum 12n) of the fourth frequency f4 at the detection frequency fd. For example, the second power is ¹⁄₁₀ or less of the fourth power. The second power may be substantially zero.

Figure 6A:
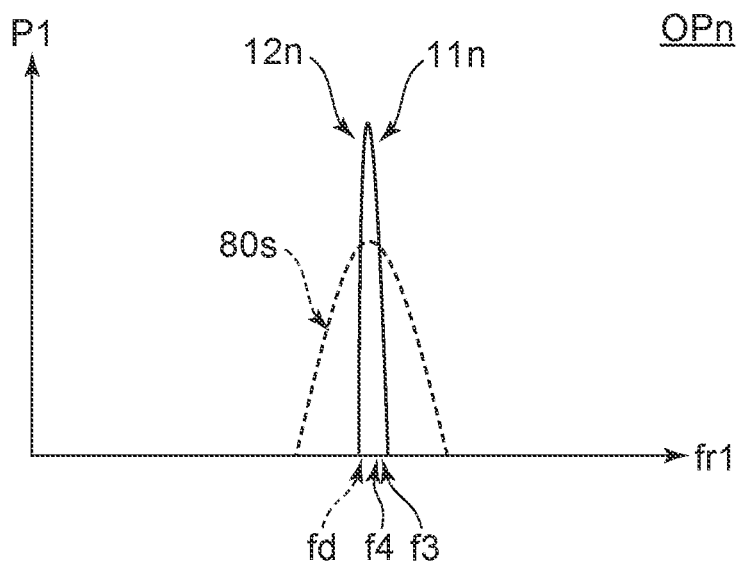
FIG. 6A and FIG. 6B are schematic diagrams illustrating an operation in the flying body according to the first embodiment.
Figure 6B:
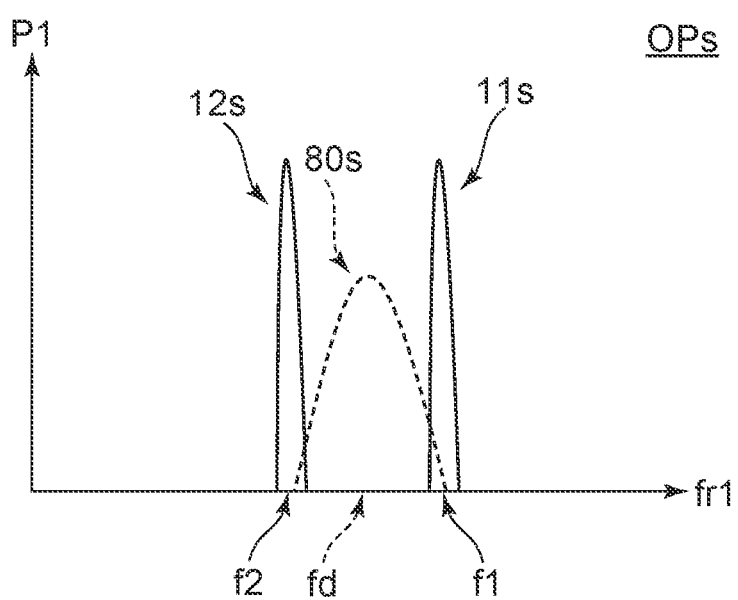

FIG. 6A and FIG. 6B are schematic diagrams illustrating an operation in the flying body according to the first embodiment.

As shown in FIG. 6A, in the spectrum 80s of the vibration of the detection target corresponding to the detection frequency fd, the component at the third frequency f3 (third component) and the component at the fourth frequency f4 (fourth component) are large. As shown in FIG. 6B, after the change of rotational speed, the component at the first frequency f1 (first component) and the component at the second frequency f2 (second component) become smaller in the vibration spectrum 80s of the detection target.

For example, the first component is smaller than the third component. The first component may be ¹⁄₁₀ or less of the third component. The first component may be substantially zero. For example, the second component is smaller than the fourth component. The second component may be ¹⁄₁₀ or less of the fourth component. The second component may be substantially zero.

As shown in FIG. 1, a plurality of first rotors 11 and a plurality of second rotors 12 may be provided. An example of control related to the plurality of first rotors 11 and the plurality of second rotors 12 will be described.

Figure 7:
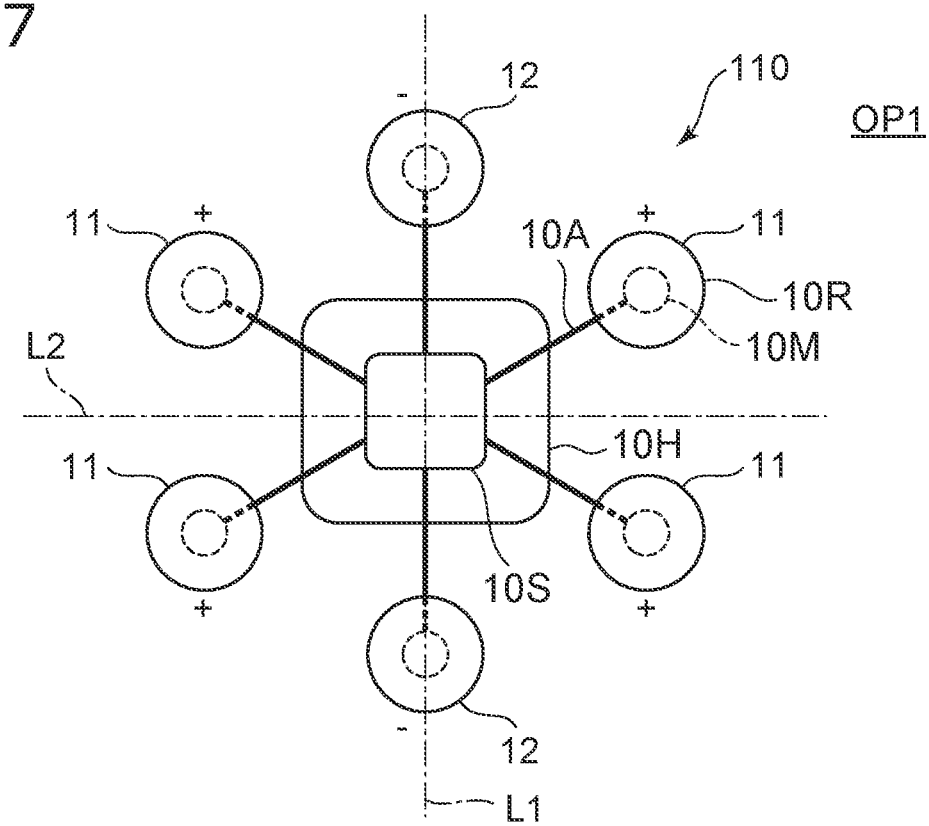
FIG. 7 is a schematic diagram illustrating an operation in the flying body according to the first embodiment.

FIG. 7 is a schematic diagram illustrating an operation in the flying body according to the first embodiment.

As shown in FIG. 7, in a first operation OP1, the positions of the plurality of first rotors 11 are linearly symmetric with respect to a first straight line L1 passing through one of the plurality of second rotors 12 and another one of the plurality of second rotors 12. The first straight line L1 is along the X-Y plane.

The positions of the plurality of first rotors 11 and the plurality of second rotors 12 may be linearly symmetric with respect to a second straight line L2. The second straight line L2 crosses the first straight line L1. The second straight line L2 is along the X-Y plane. In the first operation OP1, the influence on the attitude of the flying body 110 when rotational speed is changed is suppressed.

Figure 8:
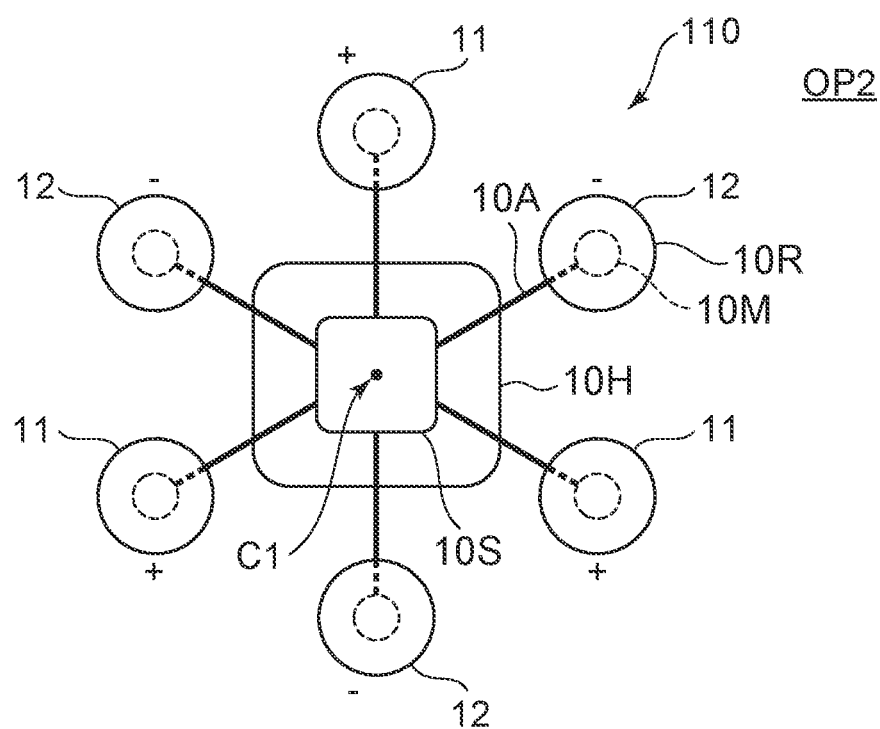
FIG. 8 is a schematic diagram illustrating an operation in the flying body according to the first embodiment.

FIG. 8 is a schematic diagram illustrating an operation in the flying body according to the first embodiment.

As shown in FIG. 8, in a second operation OP2, the positions of the plurality of first rotors 11 are point symmetrical with respect to a center position C1 between one of the plurality of second rotors 12 and another one of the plurality of second rotors 12. For example, the positions of the plurality of second rotors 12 may be point symmetrical with respect to the center position C1. In the second operation OP2, the influence on the attitude of the flying body 110 when rotational speed is changed is suppressed.

Figure 9:
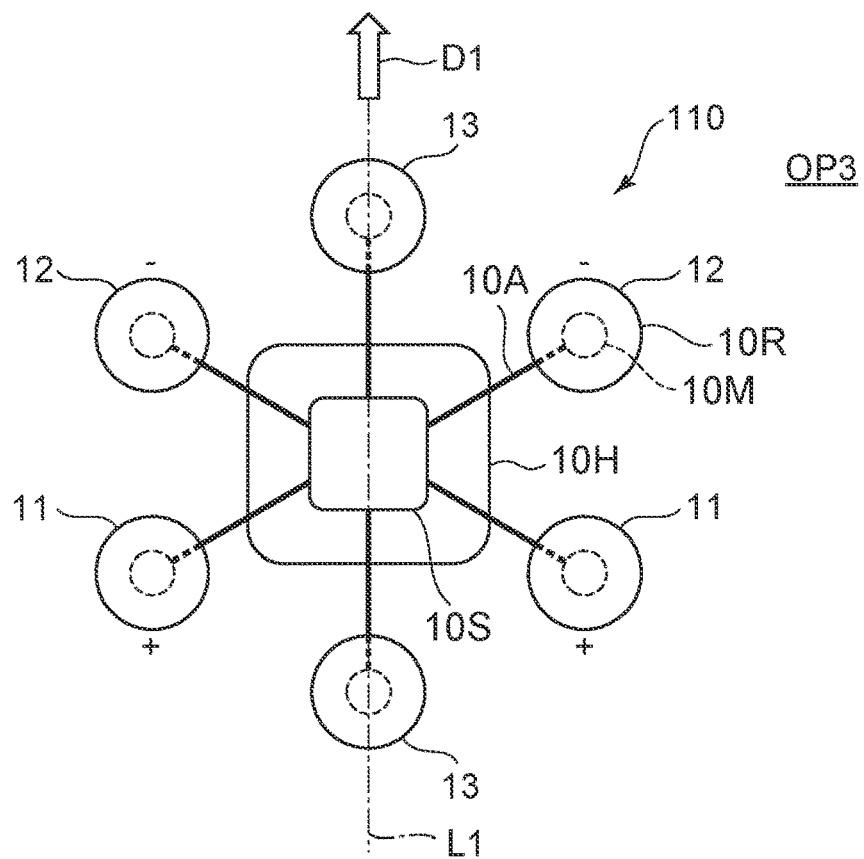
FIG. 9 is a schematic diagram illustrating an operation in the flying body according to the first embodiment.

FIG. 9 is a schematic diagram illustrating an operation in the flying body according to the first embodiment.

As shown in FIG. 9, in a third operation OP3, at least one of the positions of the plurality of first rotors 11 or the position of the plurality of second rotors 12 is linearly symmetric with respect to the first straight line L1 along the traveling direction D1 of the flying body 110. In the third operation OP3, when the rotational speed is changed while the flying body 110 is moving, the influence on the attitude of the flying body 110 is suppressed.

As shown in FIG. 9, the plurality of rotors 10R may include a plurality of third rotors 13. A direction from one of the plurality of third rotors 13 to another one of the plurality of third rotors 13 is along the traveling direction D1. The rotational speed of the plurality of third rotors 13 need not be changed in the first control operation.

In the first operation OP1 and the second operation OP2, the flying body 110 may be substantially effectively stationary in the air.

In the embodiment, the number of the plurality of first rotors 11 and the number of the plurality of second rotors 12 are preferably even. The attitude of the flying body 110 is easily stabilized.

Figure 10:
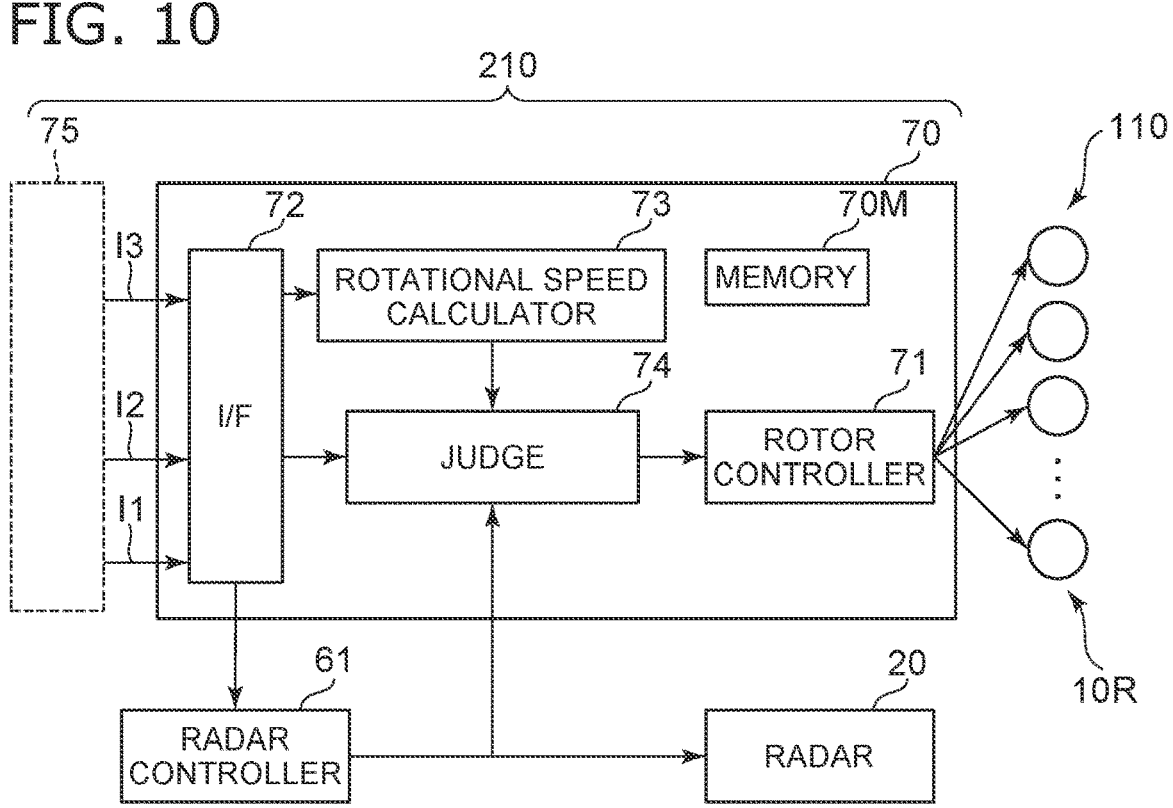
FIG. 10 is a block diagram illustrating the flying body according to the first embodiment.

FIG. 10 is a block diagram illustrating the flying body according to the first embodiment.

As shown in FIG. 10, the flying body 110 includes the radar 20, the plurality of rotors 10R, and the controller 70. The flying body 110 may include the radar controller 61. The radar controller 61 controls detection operation OPs and non-detection operation OPn by the radar 20.

The controller 70 may include, for example, a rotor controller 71 and an acquisitor 72. The acquisitor 72 may be an interface, for example. The acquisitor 72 is configured to acquire, for example, the transition information I1. The acquisitor 72 is configured to acquire, for example, a detection frequency information I2. The detection frequency information I2 relates to the frequency of the vibration of the detection target. The acquisitor 72 is configured to acquire, for example, a flight information I3. The flight information I3 includes information such as the flight route of the flying body 110.

At least one of the transition information I1, the detection frequency information I2, and the flight information I3 may be provided from the operation device 75, for example. At least one of the transition information I1, the detection frequency information I2 and the flight information I3 may be stored in a memory 70M. The memory 70M may be included in the controller 70. The memory 70M may be provided separately from the controller 70. The transition information I1 may be generated by the controller 70.

For example, the controller 70 may include the rotor controller 71. The controller 70 may include a rotational speed calculator 73 and a determinator 74. The rotor controller 71, rotational speed calculator 73, and the determinator 74 correspond to the functions of the controller 70.

For example, the rotational speed calculator 73 is configured to calculate the rotational speed of each of the plurality of rotors 10R based on the flight information I3. Based on the calculated rotational speed of each of the plurality of rotors 10R, the rotor controller 71 controls the rotational speed of the plurality of rotors 10R. For example, by controlling the rotational speed of motors 10M (see FIG. 1), the rotational speed of the plurality of rotors 10R is controlled. The flying body 110 flies along a desired path.

When the transition information I1 relating to the transition from the non-detection operation OPn to the detection operation OPs is obtained, the rotor controller 71 is controlled based on the transition information I1. At this time, the determinator 74 may determine whether or not the frequency of vibration based on the rotation of the plurality of rotors 10R has an effect on the frequency of vibration of the detection target included in the detection frequency information I2. An example of determination by the determinator 74 will be described later. When it is determined that there is the influence, the rotational speed of at least a part of the plurality of rotors 10R may be changed in the rotor controller 71. If it is not determined that there is any influence, the rotational speed of the plurality of rotors 10R may not be changed.

After the rotational speed of at least one of the plurality of rotors 10R is changed, the detection operation OPs by the radar 20 is performed by the radar controller 61.

The determinator 74 determines, for example, the relationship between the frequencies based on rotational speed of the plurality of rotors 10R calculated by rotational speed calculator 73 and the frequencies of vibrations of the detection target. The frequency based on the rotational speed of the plurality of rotors 10R includes the rotational speed of the plurality of rotors 10R. The frequency based on the rotational speed of the plurality of rotors 10R includes a product of the rotational speed of the plurality of rotors 10R and the number of blades of each of the plurality of rotors 10R. The frequency based on the rotational speed of the plurality of rotors 10R may include a natural multiple of the rotational speed of the plurality of rotors 10R. The frequency based on the rotational speed of the plurality of rotors 10R may include natural multiples of the above product.

If at least a part of the frequencies based on the rotational speed of the plurality of rotors 10R overlap the frequency of the vibration of the detection target, it is determined that there is the influence. If a part of the frequencies based on the rotational speed of the plurality of rotors 10R do not substantially overlap the frequency of the vibration of the detection target, it is determined that there is substantially no effect. The determination result of the determinator 74 is provided to the rotor controller 71. When it is determined that there is the influence, the rotational speed of at least one of the plurality of rotors 10R is changed by the rotor controller 71.

Second Embodiment

The second embodiment relates to a controller. As shown in FIG. 10, the control device 210 may include at least a part of the controller 70. The control device 210 may include at least a part of the operation device 75.

The control device 210 according to the embodiment may include the controller 70. The controller 70 is configured to control the flying body 110 including the radar 20 and the plurality of rotors 10R. The plurality of rotors 10R include the first rotor 11. The radar 20 is configured to perform a detection operation OPs and a non-detection operation OPn. The controller 70 is configured to perform the first control operation (step S130 in FIG. 6) at the time of the first transition from the non-detection operation OPn to the detection operation OPs. In the first control operation, the controller 70 performs the first change for changing rotational speed of the first rotor 11 from the rotational speed of the first rotor 11 in the non-detection operation OPn. The detection operation OPs is performed after the first control operation.

As described above, the plurality of rotors 10R may include the second rotor 12. In the first control operation, the controller 70 may perform the second change to change the rotational speed of the second rotor 12 from the rotational speed of the second rotor 12 in the non-detection operation OPn. The first change described above includes performing one of the increase and the decrease in the rotational speed of the first rotor 11 from rotational speed of the first rotor 11 in the non-detection operation OPn. The second change described above includes performing the other one of the increase and the decrease in the rotational speed of the second rotor 12 from the rotational speed of the second rotor 12 in the non-detection operation OPn.

The controller 70 may perform the second control operation (step S150 in FIG. 6) at the time of the second transition from the detection operation OPs to the non-detection operation OPn. The second control operation includes, for example, returning the rotational speed of the first rotor 11 to the rotational speed of the first rotor 11 in the non-detection operation OPn, and returning the rotational speed of the second rotor 12 to the rotational speed of the second rotor 12 in the non-detection operation OPn.

For example, the radar 20 is configured to detect the vibration of the detection target in the detection operation OPs.

The control device 210 according to the embodiment may be configured to perform at least a part of the control described with respect to the first embodiment. For example, the control device 210 may perform at least one of the first operation OP1, the second operation OP2, or the third operation OP3. According to the embodiment, there can be provided a control device for a flying body capable of highly accurate detection.

Embodiments may include the following configurations (e.g., technical proposals).

Configuration 1

A flying body, comprising:

a radar;

a supporter;

a plurality of rotors supported by the supporter; and a controller, the rotors including a first rotor, the radar being configured to perform a detection operation and a non-detection operation, the controller being configured to perform a first control operation in a first transition from the non-detection operation to the detection operation, the controller being configured to perform a first change in the first control operation to change a rotational speed of the first rotor from a rotational speed of the first rotor in the non-detection operation, and the detection operation being performed after the first control operation.

Configuration 2

The flying body according to Configuration 1, wherein the rotors further include a second rotor, in the first control operation, the controller further performs a second change in which a rotational speed of the second rotor is changed from a rotational speed of the second rotor in the non-detection operation in the second change, the first change includes performing one of an increase and a decrease in the rotational speed of the first rotor from the rotational speed of the first rotor in the non-detection operation, and the second change includes performing other one of the increase and the decrease in the rotational speed of the second rotor from the rotational speed of the second rotor in the non-detection operation.

Configuration 3

The flying body according to Configuration 2, wherein
the controller is configured to perform a second control
operation in a second transition from the detection
operation to the non-detection operation,
the second control operation includes
returning the rotational speed of the first rotor to the
rotational speed of the first rotor in the non-detection
operation, and
returning the rotational speed of the second rotor to the
rotational speed of the second rotor in the non-
detection operation.

Configuration 4

The flying body according to Configuration 3, wherein the
radar is configured to detect a vibration of a detection target
in the detection operation.

Configuration 5

The flying body according to Configuration 4, wherein a
frequency component of the vibration of the detection target
includes a natural number multiple of at least one of a
frequency of the rotational speed of the first rotor in the
non-detection operation and a frequency of the rotational
speed of the second rotor in the non-detection operation.

Configuration 6

The flying body according to Configuration 4, wherein
a vibration of the flying body includes a first frequency
corresponding to the rotational speed of the first rotor
in the detection operation and a second frequency
corresponding to the rotational speed of the second
rotor in the detection operation, and
a detection frequency of the detection target is between
the first frequency and the second frequency.

Configuration 7

The flying body according to any one of Configurations 4
to 6, wherein the first control operation is performed based
on a transition information based on at least one of acqui-
sition of information input from a user, a predetermined
time, a position of the flying body, a relative position
between the detection target and the flying body, or a
detection result by a sensor provided in the flying body.

Configuration 8

The flying body according to Configuration 7, wherein
upon obtaining the transition information, the controller
performs the first control operation,
after the first control operation, the radar performs the
detection operation, and
after the detection operation, the controller performs the
second control operation.

Configuration 9

The flying body according to any one of Configurations 2
to 8, wherein
a plurality of the first rotors and a plurality of the second
rotors are provided, and
positions of the plurality of first rotors are linearly sym-
metrical with respect to a first straight line passing
through one of the plurality of second rotors and
another one of the plurality of second rotors.

Configuration 10

The flying body according to any one of Configurations 2
to 8, wherein
a plurality of the first rotors and a plurality of the second
rotors are provided, and
positions of the plurality of first rotors are point sym-
metrical with respect to a center position between one
of the plurality of second rotors and another one of the
plurality of second rotors.

Configuration 11

The flying body according to Configuration 10, wherein
the positions of the plurality of second rotors are point
symmetrical with respect to the center position.

Configuration 12

The flying body according to any one of Configurations 2
to 8, wherein
a plurality of the first rotors and a plurality of the second
rotors are provided, and
at least one of positions of the plurality of first rotors and
positions of the plurality of second rotors is linearly
symmetrical with respect to a first straight line along a
traveling direction of the flying body.

Configuration 13

The flying body according to any one of Configurations 9
to 12, wherein a number of the plurality of first rotors and
a number of the plurality of second rotors are even.

Configuration 14

A control device, comprising:
a controller configured to control a flying body including
a radar and a plurality of rotors,
the radar being configured to perform a detection opera-
tion and a non-detection operation,
the controller being configured to perform a first control
operation in a first transition from the non-detection
operation to
the detection operation,
the plurality of rotors including a first rotor, the controller
being configured to perform a first change in the first
control operation to change a rotational speed of the
first rotor from a rotational speed of the first rotor in the
non-detection operation, and
the detection operation being performed after the first
control operation.

Configuration 15

The control device according to Configuration 14,
wherein
the plurality of rotors include a second rotor,
in the first control operation, the controller performs a
second change in which a rotational speed of the second rotor is changed from a rotational speed of the second rotor in the non-detection operation in the second change, the first change includes performing one of an increase and a decrease in the rotational speed of the first rotor from the rotational speed of the first rotor in the non-detection operation, and the second change includes performing other one of the increase and the decrease in the rotational speed of the second rotor from the rotational speed of the second rotor in the non-detection operation.

Configuration 16

The control device according to Configuration 15, wherein
the controller is configured to perform a second control operation in a second transition from the detection operation to the non-detection operation,
the second control operation includes:
returning the rotational speed of the first rotor to the rotational speed of the first rotor in the non-detection operation; and
returning the rotational speed of the second rotor to the rotational speed of the second rotor in the non-detection operation.

Configuration 17

The control device according to Configuration 15 or 16, wherein the radar is configured to detect a vibration of a detection target in the detection operation.

Configuration 18

A control program, comprising:
causing a controller to control a flying body including radar and a plurality of rotors,
the radar being configured to perform a detection operation and a non-detection operation,
the controller being configured to perform a first control operation in a first transition from the non-detection operation to the detection operation,
the plurality of rotors including a first rotor,
the controller being configured to perform a first change in the first control operation to change a rotational speed of the first rotor from a rotational speed of the first rotor in the non-detection operation, and
the detection operation being performed after the first control operation.

Configuration 19

The control program according to Configuration 18, wherein
the plurality of rotors include a second rotor,
in the first control operation, the controller performs a second change in which a rotational speed of the second rotor is changed from a rotational speed of the second rotor in the non-detection operation in the second change,
the first change includes performing one of an increase and a decrease in the rotational speed of the first rotor from the rotational speed of the first rotor in the non-detection operation, and
the second change includes performing other one of the increase and the decrease in the rotational speed of the second rotor from the rotational speed of the second rotor in the non-detection operation.

Configuration 20

A control method to control a flying body including radar and a plurality of rotors, the radar being configured to perform a detection operation and a non-detection operation, the plurality of rotors including a first rotor, the method comprising:
performing a first control operation in a first transition from the non-detection operation to the detection operation;
performing a first change in the first control operation to change a rotational speed of the first rotor from a rotational speed of the first rotor in the non-detection operation,
the detection operation being performed after the first control operation.

According to the embodiment, a radiation detector capable of reducing noise can be provided.

In the specification of the present application, "electrically connected state" includes a state in which a plurality of conductors are physically in contact with each other and current flows between the plurality of conductors. "Electrically connected state" includes a state in which another conductor is inserted between a plurality of conductors and current flows between the plurality of conductors. "Electrically connected state" includes a state in which a current flows between a plurality of portions included in one conductor. The boundaries of multiple portions included in one conductor may be unclear or clear.

In the specification of the present application, "perpendicular" and "parallel" include not only strictly perpendicular and strictly parallel, but also variations in the manufacturing process, and may be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in radiation detectors such as detection portions, load portions, conductive layers, organic layers, scintillator layers, electrodes, semiconductor layers, base bodies, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all radiation detectors practicable by an appropriate design modification by one skilled in the art based on the radiation detectors described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A flying body, comprising:
   a radar;
   a supporter;
   a plurality of rotors supported by the supporter; and
   a controller,
   the rotors including a first rotor,
   the radar being configured to perform a detection operation and a non-detection operation,
   the controller being configured to perform a first control operation in a first transition from the non-detection operation to the detection operation,
   the controller being configured to perform a first change in the first control operation to change a rotational speed of the first rotor from a rotational speed of the first rotor in the non-detection operation, and
   the detection operation being performed after the first control operation.

2. The body according to claim 1, wherein
   the rotors further include a second rotor,
   in the first control operation, the controller further performs a second change in which a rotational speed of the second rotor is changed from a rotational speed of the second rotor in the non-detection operation in the second change,
   the first change includes performing one of an increase and a decrease in the rotational speed of the first rotor from the rotational speed of the first rotor in the non-detection operation, and
   the second change includes performing other one of the increase and the decrease in the rotational speed of the second rotor from the rotational speed of the second rotor in the non-detection operation.

3. The body according to claim 2, wherein
   the controller is configured to perform a second control operation in a second transition from the detection operation to the non-detection operation,
   the second control operation includes
   returning the rotational speed of the first rotor to the rotational speed of the first rotor in the non-detection operation, and
   returning the rotational speed of the second rotor to the rotational speed of the second rotor in the non-detection operation.

4. The body according to claim 3, wherein the radar is configured to detect a vibration of a detection target in the detection operation.

5. The body according to claim 4, wherein a frequency component of the vibration of the detection target includes a natural number multiple of at least one of a frequency of the rotational speed of the first rotor in the non-detection operation and a frequency of the rotational speed of the second rotor in the non-detection operation.

6. The body according to claim 4, wherein
   a vibration of the flying body includes a first frequency corresponding to the rotational speed of the first rotor in the detection operation and a second frequency corresponding to the rotational speed of the second rotor in the detection operation, and
   a detection frequency of the detection target is between the first frequency and the second frequency.

7. The body according to claim 4, wherein the first control operation is performed based on a transition information based on at least one of acquisition of information input from a user, a predetermined time, a position of the flying body, a relative position between the detection target and the flying body, or a detection result by a sensor provided in the flying body.

8. The body according to claim 7, wherein
   upon obtaining the transition information, the controller performs the first control operation,
   after the first control operation, the radar performs the detection operation, and
   after the detection operation, the controller performs the second control operation.

9. The body according to claim 2, wherein
   a plurality of the first rotors and a plurality of the second rotors are provided, and
   positions of the plurality of first rotors are linearly symmetrical with respect to a first straight line passing through one of the plurality of second rotors and another one of the plurality of second rotors.

10. The body according to claim 2, wherein
    a plurality of the first rotors and a plurality of the second rotors are provided, and
    positions of the plurality of first rotors are point symmetrical with respect to a center position between one of the plurality of second rotors and another one of the plurality of second rotors.

11. The body according to claim 10, wherein the positions of the plurality of second rotors are point symmetrical with respect to the center position.

12. The body according to claim 2, wherein
    a plurality of the first rotors and a plurality of the second rotors are provided, and
    at least one of positions of the plurality of first rotors and positions of the plurality of second rotors is linearly symmetrical with respect to a first straight line along a traveling direction of the flying body.

13. The body according to claim 9, wherein a number of the plurality of first rotors and a number of the plurality of second rotors are even.

14. A control device, comprising:
    a controller configured to control a flying body including a radar and a plurality of rotors,
    the radar being configured to perform a detection operation and a non-detection operation,
    the controller being configured to perform a first control operation in a first transition from the non-detection operation to the detection operation,
    the plurality of rotors including a first rotor,
    the controller being configured to perform a first change in the first control operation to change a rotational speed of the first rotor from a rotational speed of the first rotor in the non-detection operation, and
    the detection operation being performed after the first control operation.

15. The device according to claim 14, wherein
    the plurality of rotors include a second rotor,
    in the first control operation, the controller performs a second change in which a rotational speed of the second rotor is changed from a rotational speed of the second rotor in the non-detection operation in the second change,
    the first change includes performing one of an increase and a decrease in the rotational speed of the first rotor from the rotational speed of the first rotor in the non-detection operation, and the second change includes performing other one of the increase and the decrease in the rotational speed of the second rotor from the rotational speed of the second rotor in the non-detection operation.

16. The device according to claim 15, wherein
the controller is configured to perform a second control operation in a second transition from the detection operation to the non-detection operation,
the second control operation includes:
returning the rotational speed of the first rotor to the rotational speed of the first rotor in the non-detection operation; and
returning the rotational speed of the second rotor to the rotational speed of the second rotor in the non-detection operation.

17. The device according to claim 15, wherein the radar is configured to detect a vibration of a detection target in the detection operation.

18. A program, comprising:
causing a controller to control a flying body including radar and a plurality of rotors,
the radar being configured to perform a detection operation and a non-detection operation,
the controller being configured to perform a first control operation in a first transition from the non-detection operation to the detection operation,
the plurality of rotors including a first rotor,
the controller being configured to perform a first change in the first control operation to change a rotational speed of the first rotor from a rotational speed of the first rotor in the non-detection operation, and
the detection operation being performed after the first control operation.

19. The program according to claim 18, wherein
the plurality of rotors include a second rotor,
in the first control operation, the controller performs a second change in which a rotational speed of the second rotor is changed from a rotational speed of the second rotor in the non-detection operation in the second change,
the first change includes performing one of an increase and a decrease in the rotational speed of the first rotor from the rotational speed of the first rotor in the non-detection operation, and
the second change includes performing other one of the increase and the decrease in the rotational speed of the second rotor from the rotational speed of the second rotor in the non-detection operation.

* * * * *